United States Patent [19]

Nield et al.

[11] 4,415,699

[45] Nov. 15, 1983

[54] EXTRUDED PROFILES

[75] Inventors: Eric Nield, Watton-At-Stone; Martin K. Thompson, Biggleswade, both of England

[73] Assignee: Imperial Chemical Industries PLC, London, England

[21] Appl. No.: 276,640

[22] Filed: Jun. 23, 1981

[30] Foreign Application Priority Data

Jul. 14, 1980 [GB] United Kingdom ............... 8022949

[51] Int. Cl.³ .................. C08L 77/06; C08L 67/02
[52] U.S. Cl. .................................. 524/538; 524/447; 524/449; 524/456
[58] Field of Search .................. 260/40 R; 525/425; 524/538

[56] References Cited

U.S. PATENT DOCUMENTS

| 3,553,288 | 1/1971 | Oda et al. | 525/425 |
| 3,644,271 | 2/1972 | Tulley | 260/40 R |
| 4,013,613 | 3/1977 | Abolins et al. | 525/425 |
| 4,229,340 | 10/1980 | Druin et al. | 525/425 |

FOREIGN PATENT DOCUMENTS

| 48-5791 | 2/1973 | Japan | 525/425 |
| 1280780 | 7/1972 | United Kingdom . | |

OTHER PUBLICATIONS

Chemical Abstracts, vol. 84, No. 20, 1976, p. 54, Abstract 136732g.
Columbus, Ohio (US) & J-A-75 148 496 (Dainippon Ink & Chemicals), 2-11-1975 (Abstract).

*Primary Examiner*—Lewis T. Jacobs
*Attorney, Agent, or Firm*—Cushman, Darby & Cushman

[57] ABSTRACT

An extruded profiled section characterized in that it has been extruded from a composition comprising a blend of a linear polyamide, a linear polyester containing at least 80% by weight of ethylene terephthalate units and an inorganic fibrous filler wherein the composition contains 5 to 60% by weight of the composition of the filler and the weight ratio of polyamide to polyester is between 1:1 and 49:1, which composition preferably has a melt flow index of not greater than 2 measured according to ASTM-D1238 using a standard die of bore 2.096 mm, length 8 mm and a load of 2.16 kg at a temperature of 285° C.

A preferred composition for preparing the extruded profiled section comprises a blend in which the polyamide contains an excess of terminal amino groups, and preferably at least 20 g equivalents of terminal amino groups per $10^6$ g of polyamide, in excess of the carboxyl groups.

4 Claims, No Drawings

EXTRUDED PROFILES

This invention relates to filled compositions consisting of blends of thermoplastic polyesters and polyamides which are suitable for extrusion into profiles having good dimensional tolerance.

Polyamides which are suitable for extrusion applications, particularly applications in which the extrudates are required to have narrow dimensional tolerances, normally have a high molecular weight so that the melt viscosity of the polyamide passing through the die is high. This high viscosity reduces the risk of the profile sagging or changing shape after passing through the die. The use of a high molecular weight nylon is however subject to some disadvantages. The main disadvantage is that it is usually necessary in the preparation of the polyamide to increase the molecular weight of the polyamide after melt polymerisation in the reaction vessel by a further polymerisation process in the solid phase. This further stage adds to the cost of the polyamide for this type of application.

Alternative polyamide compositions have now been developed which can be extruded to profiled sections of narrow dimensional tolerance.

According to the invention there is provided an extruded profiled section characterised in that it has been extruded from a composition comprising a blend of a linear polyamide, a linear polyester containing at least 80% by weight of ethylene terephthalate units and an inorganic fibrous filler wherein the composition contains 5 to 60% by weight of the composition of the filler and the weight ratio of polyamide to polyester is between 1:1 and 49:1, preferably between 2:1 and 19:1. The preferred composition used for making the profile should have an MFI of not greater than 2 measured as hereinafter described.

The invention also includes a method of extruding a profiled section characterised in that a composition comprising a blend of a linear polyamide, a linear polyester containing at least 80% by weight of ethylene terephthalate units and an inorganic fibrous filler wherein the composition contains 5 to 60% by weight of the composition of the fibrous filler and the weight ratio of polyamide to polyester is between 1:1 and 49:1, preferably between 2:1 and 19:1, is intimately blended and extruded through a die of profiled section.

A particularly useful feature of the invention is that the viscosity characteristics of the composition are highly shear dependent. Thus under the high shear conditions pertaining in an extruder the melt viscosity is relatively low and can be processed without difficulty. On the other hand under low shear conditions such as experienced on passing through the profiled die the composition shows a high viscosity. The viscosity characteristics of the composition under low shear stress make the composition ideally suited for extrusion applications where low dimensional tolerances in the extruded profiled section are required.

A further surprising feature of the invention is the behaviour of the composition when compared to the same composition not containing glass or other fibrous filler, or when compared to a composition containing a particulate filler. A composition made up of a blend of a polyamide and a polyester has a melt viscosity which shows a slight increase over the individual components but is not sufficiently high for successful profiled extrusion unless the molecular weights of the individual polymer components of the blend are high. As indicated previously this usually requires the use of an additional solid phase polymerisation step. By contrast the compositions of the present invention have a melt viscosity which is very much higher than that of the blend of the polymeric constituents alone. In other words the invention provides a material with a melt viscosity high enough for extrusion into profile sections of narrow dimensional tolerance without the necessity of preparing high molecular weight polymers.

The polyamides for use in the invention are synthetic polyamides produced by polymerising mono-aminomonocarboxylic acids, or lactams thereof, or a mixture of a diamine and a dicarboxylic acid. Suitable mono-aminomonocarboxylic acids or lactams thereof are, for example ε-aminocaproic acid, caprolactam, 9-aminononanoic acid, 11-aminoundecanoic acid, 17-aminoheptadecanoic acid, dodecanolactam, capryllactam and enantholactam.

Preferred diamines are of general formula $H_2N(CH_2)_mNH_2$ wherein m is an integer of from 2 to 12 such as trimethylene diamine, tetramethylene diamine, pentamethylene diamine and in particular hexamethylene diamine. Preferred dicarboxylic acids are of the formula $HOOC.Y.COOH$ wherein Y is a divalent aliphatic radical containing at least 2 carbon atoms for example sebacic acid, octadecanoic acid, suberic acid, azelaic acid, undecanoic acid, glutaric acid, pimelic acid and in particular adipic acid.

Preferred polyamides are those known as nylon 6 (a polymer of caprolactam), nylon 66 (a polymer of hexamethylene adipamide), nylon 610 (a polymer of hexamethylene sebacamide), nylon 11 (a polymer of undecanolactam) and nylon 12 (a polymer of dodecanolactam). Mixtures of polyamides and copolymers formed from the monomers described are also included within the term "polyamide" as used in this specification. It is preferred that the polyamides should contain an excess of terminal amine groups over the number of terminal carboxyl groups. The melt viscosity of the composition is particularly high when the polyamide of the composition contains at least 20 g equivalents of terminal amino groups per $10^6$ g of polyamide in excess of the carboxyl groups.

Accordingly there is also provided a thermoplastics composition suitable for extrusion into extruded profiled sections comprising a blend of a linear polyamide, a linear polyester containing at least 80% by weight of ethylene terephthalate units, and an inorganic fibrous filler characterised in that the composition contains from 5 to 60% by weight of the composition of the inorganic fibrous filler, the weight ratio of polyamide to polyester is between 1:1 and 49:1, preferably between 2:1 and 19:1 and wherein the polyamide contains an excess, preferably at least 20 g equivalents of terminal amino groups per $10^6$ g of polyamide in excess of the carboxyl groups.

The polyesters suitable for use in the invention are linear thermoplastic polyesters containing at least 80% by weight of ethylene terephthalate units. Surprisingly, when polyesters consisting predominantly of tetramethylene terephthalate units are used in place of the ethylene terephthalate polymer unusually high viscosities are not obtained.

The inorganic fibrous filler for use in the invention is preferably glass fibre. Although finely divided mineral fillers have only a slight effect they may be present in addition to the fibrous filler. Suitable mineral fillers are glass ballotini, kaolin, mica, calcined clay, wollastonite and talc.

It is preferred that the concentration of fibrous filler should be between 15 and 45% by weight of the composition, particularly when glass fibre is used.

The composition of the invention can be made by a simple blending process in which granules of the polyamide and the polyester and inorganic fibres, for example, glass fibres of nominal length of, say, 3 mm are tumble blended. Such a composition may then be fed directly to the extruder where an intimate molten mixture of the polymeric ingredients is produced. In the course of this mixing process the glass fibre length will be significantly reduced. Alternatively, to avoid any problems of segregation of the glass fibre from the composition the glass may be incorporated in one or both of the polymeric components so that a dry blend of the two types of polymer granule can be employed. In preferred compositions containing about 30% by weight of the composition of glass fibre it is clearly easier to incorporate the glass fibre in the major polymer component, namely the polyamide.

Yet another possibility is the preparation of granules of the composition by a process in which the ingredients are compounded together under melt conditions in a screw extruder and the product extruded as lace which is subsequently cut into granules. These granules containing an intimate blend of the polyamide, the polyester and, for example, glass fibre provide a very suitable feed composition for extrusion of profiled section. The glass fibre length in these completely compounded granules ranges from about 0.1 mm up to about 1.5 mm or more, with an average fibre length generally in the region 0.2 to 0.4 mm.

The invention is further illustrated by reference to the following Examples in which the proportions are expressed as percentages by weight of the total composition.

EXAMPLE 1

Compositions containing the ingredients listed in Table 1 were prepared by compounding in a single screw extruder at a nominal melt temperature of 285° C. The melt flow index of the compositions were determined according to ASTM-D 1238 using a standard die of bore 2.096 mm, length of 8 mm and a load of 2.16 kg at a temperature of 285° C. The melt flow indices for the nylon and polyester used in the compositions were 43 and 66 respectively. The nylon 66 used in the composition contained approximately equal numbers of amine and carboxyl end-groups.

TABLE 1

|   | Nylon content (%) | PET content (%) | Glass content (%) | Melt Flow Index |
|---|---|---|---|---|
| A | 67% nylon 66 | 0 | 33 | 8.3 |
| B | 62% nylon 66 | 5 | 33 | 3.9 |
| C | 57% nylon 66 | 10 | 33 | 3.3 |
| D | 47% nylon 66 | 20 | 33 | 2.6 |
| E | 37% nylon 66 | 30 | 33 | 2.0 |
| F | 47% nylon 66 | 20[a] | 33 | 1.5 |
| G | 67% nylon 6 | — | 33 | 34 |
| H | 47% nylon 6 | 20 | 33 | 4.0 |
| I | 67% nylon 66:6 (90:10) | — | 33 | 13.9 |
| J | 47% nylon 66:6 (90:10) | 20 | 33 | 3.7 |

TABLE 1-continued

|   | Nylon content (%) | PET content (%) | Glass content (%) | Melt Flow Index |
|---|---|---|---|---|
| K | 47% nylon 66[b] | 20 | 33 | 0.7 |

[a]The PET used was of high molecular weight having a melt flow index of 27.
[b]The nylon 66 used contained an excess of 30μ equivalents/g of amine over carboxyl end-groups.

The glass filled nylon/PET compositions listed in Table 1 were all suitable for producing profiled extrusions of good dimensional tolerance.

In a comparative experiment a composition containing 47% by weight of nylon 66 (melt flow index 43), 20% poly(tetramethylene terephthalate) (melt flow index 37) and 33% glass was prepared. The melt flow index of the composition (6.9) was too high for it to be suitable for producing satisfactory profiled extrusions.

A profile suitable as a thermal barrier in doubleglazed aluminum framed windows was extruded through a die of appropriate profile without using conventional sizing means using compositions A, D, F and K. Profiles from compositions D, F and K had significantly greater dimensional tolerance than the profile from composition A in that the dimensions more closely matched the profile of the die.

EXAMPLE 2

The effect of the amine end-group concentration in the nylon was evaluated by making a series of blends as follows.

A blend of 47% nylon 66 chip, 20% of polyethylene terephthalate chip (as used in Example 1) and 33% glass fibre (3 mm chopped strands), was intimately mixed in a polyethylene bag. The blend was passed through a 2 inch diameter single screw extruder with a 31½:1 length-/diameter ratio and equipped with a devolatilisation zone to which vacuum was applied. The barrel heating zones were set at 300° C. and the screw speed was 120 rpm. A single cylindrical lace was extruded which was cooled in a water bath and cut into pellets.

The melt flow index of the product was measured after vacuum oven drying for 18 hours at 90° C. The test conditions were, temperature 285° C., weight 2.16 kg and die 2.096 mm diameter, 8 mm length.

The following results were obtained.

TABLE 2

| Excess of amine over carboxyl groups μ equiv/g | MFI (g/10 min) |
|---|---|
| −65 | 4.3 |
| −28 | 3.4 |
| 0 | 2.9 |
| 34 | 1.2 |
| 62 | 0.4 |

EXAMPLE 3

The procedure of Example 1 was used to evaluate the effect of glass beads and the plate-like filler mica in comparison with glass fibre in the compositions of the invention. Table 3 below records the compositions produced. The nylon 66 used in the composition contained 45 g equivalents of amine end-groups per $10^6$ g polyamide in excess of the carboxyl groups. The poly(ethylene terephthalate) was the same as that used in Example 1.

TABLE 3

| Nylon content (%) | PET content (%) | Filler content (%) | Melt Flow Index |
| --- | --- | --- | --- |
| 47 | 20 | 33 glass fibre | 1.2 |
| 40 | 20 | 40 Ballotini* 3000 | 3.8 |
| 40 | 20 | 40 Mica W160** | 5.4 |

*Ballotini 3000 = soda glass beads of which 80% of the beads have a diameter in the range 4 to 40 microns available from Croxton and Garry Limited.
**Mica W160 = a mica with a mean particle diameter of 1.5 microns obtained from Norwegian Talc (UK) Limited.

These figures show that glass fibre is more effective at increasing the melt viscosity than a higher concentration of either glass beads or mica.

We claim:

1. A method of extruding a profile section comprising intimately blending and extruding a blend of a linear polyamide, a linear polyester containing at least 80% by weight of ethylene terephthalate units and an inorganic fibrous filler, wherein the composition contains 5 to 60% by weight of the composition of the fibrous filler and the weight ratio of polyamide to polyester is between 2:1 and 19:1, said composition being extruded through a die of profiled section wherein the melt flow index of the composition is not greater than 2 measured according to ASTM-D1238 using a standard die of bore 2.096 mm, length 8 mm and a load of 2.16 kg at a temperature of 285° C. and the polyamide contains at least 20 g equivalents of terminal amino groups per $10^6$ of polyamide in excess of the carboxyl groups.

2. A method according to claim 1 wherein the polyamide, polyester and fibrous filler have been compounded together under melt conditions to provide an intimate mixture which is formed into granules as a feed composition for extrusion of the profiled section.

3. A method according to claim 1 in which the inorganic fibrous filler is glass fiber.

4. An extruded profiled section produced by the method of claim 1.

* * * * *